Figure 1:
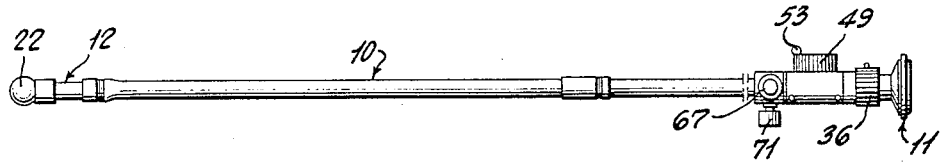

June 21, 1966  J. A. TSEPELEV ET AL  3,256,875
FLEXIBLE GASTROSCOPE

Filed May 17, 1963  5 Sheets-Sheet 1

INVENTORS
JURI A. TSEPELEV
MARIA N. VILIAM-VILMONT
IGOR A. SLAVIN
ELIASAR B. ROSENFELD
BORIS I. USHAKOV
BY
ATTORNEYS

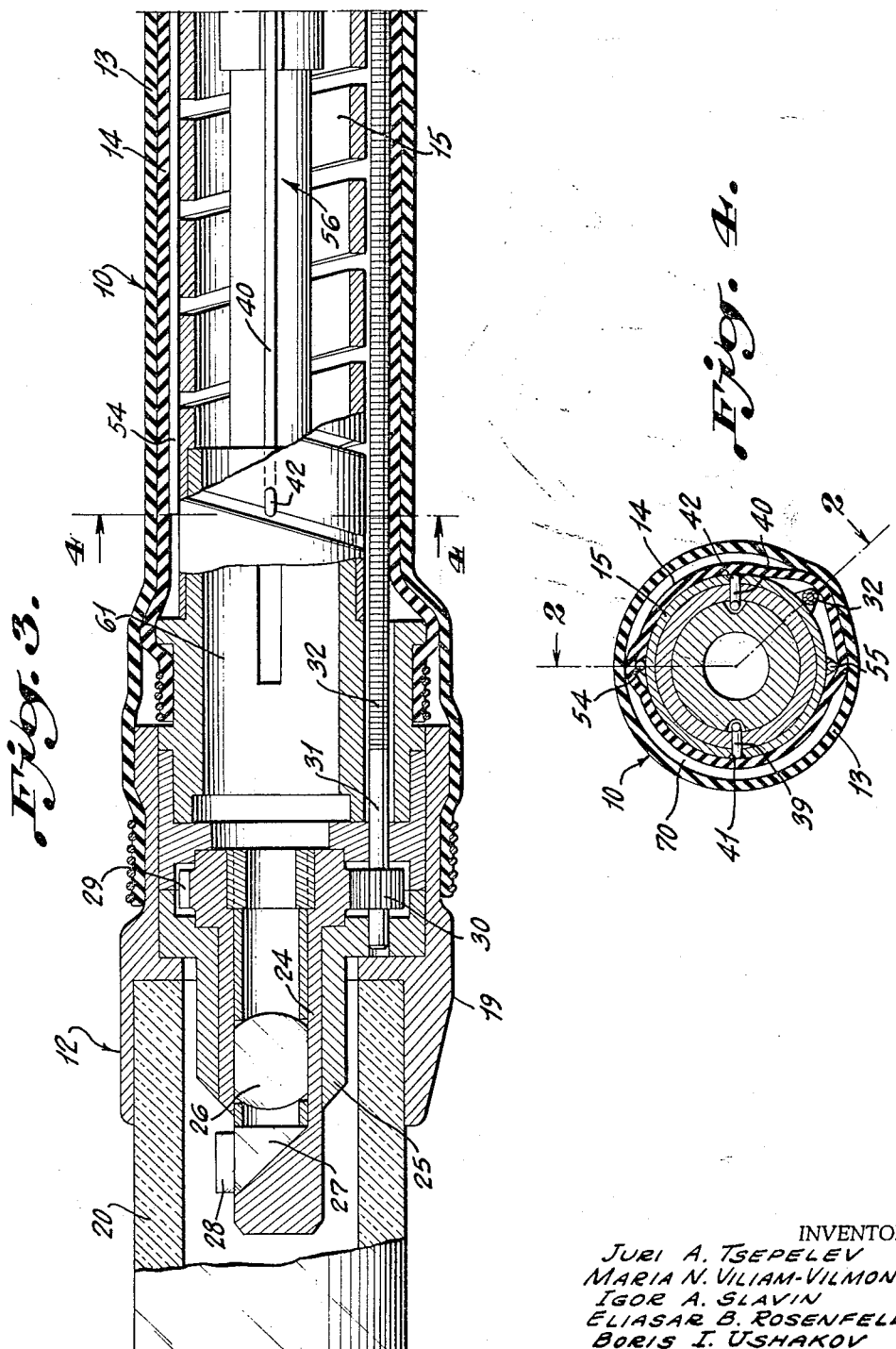

June 21, 1966  J. A. TSEPELEV ET AL  3,256,875
FLEXIBLE GASTROSCOPE

Filed May 17, 1963  5 Sheets-Sheet 3

INVENTORS
JURI A. TSEPELEV
MARIA N. VILIAM-VILMONT
IGOR A. SLAVIN
ELIASAR B. ROSENFELD
BORIS I. USHAKOV

BY Glascock, Downing & Seebold
ATTORNEYS

June 21, 1966  J. A. TSEPELEV ET AL  3,256,875
FLEXIBLE GASTROSCOPE
Filed May 17, 1963  5 Sheets-Sheet 4

INVENTORS
JURI A. TSEPELEV
MARIA N. VILIAM-VILMONT
IGOR A. SLAVIN
ELIASAR B. ROSENFELD
BORIS I. USHAKOV
BY
ATTORNEYS

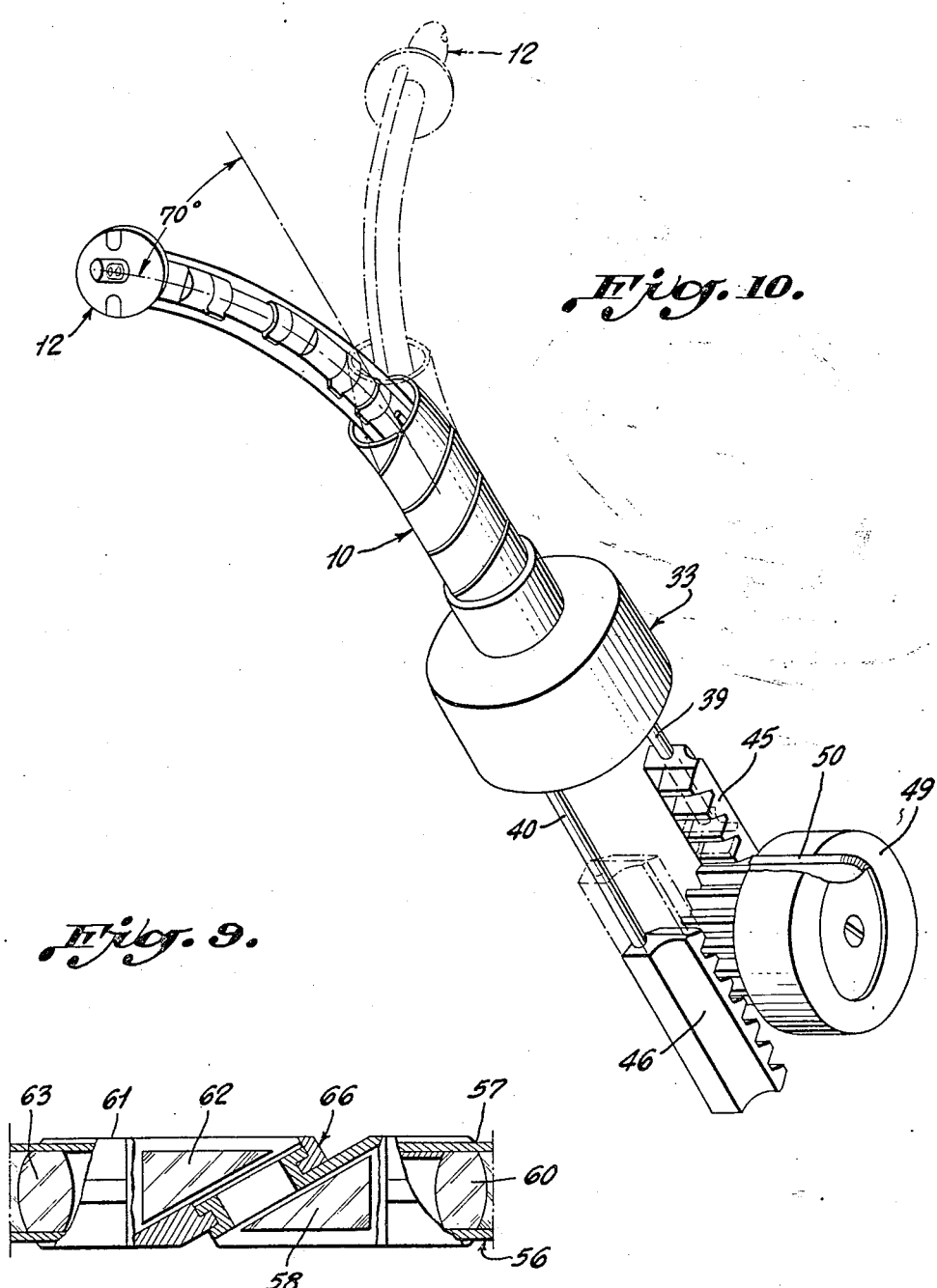

United States Patent Office 3,256,875
Patented June 21, 1966

3,256,875
FLEXIBLE GASTROSCOPE
Juri Alexeevich Tsepelev, Nogatinskoie Shausse 2, Apt. 6; Maria Nikolaevna Viliam-Vilmont, ul. Kirova 46/–2, Apt. 8; Igor Arkadievich Slavin, Babushkin dist. ul. Menginski 20, Apt. 11; Eliasar Borisovich Rosenfeld, ul. Kirova 14/–2, Apt. 3; and Boris Ivanovich Ushakov, Bogoslovsik per. 13/–4, Apt. 10, all of Moscow, U.S.S.R.
Filed May 17, 1963, Ser. No. 281,190
3 Claims. (Cl. 128—8)

This application is a continuation-in-part of our copending application Serial No. 846,767, filed July 22, 1959, now abandoned.

This invention relates to medical instruments, and more particularly to a flexible gastroscope primarily intended for examination of the interior of the stomach.

Numerous attempts have heretofore been made to provide flexible gastroscopes which would serve to permit examination of the entire interior of the stomach, but much difficulty has been experienced in providing such gastroscopes having acceptable image quality, a suitable field of vision, ease and convenience of operation, and in fact, it has proved virtually impossible to provide a satisfactory instrument of this nature of a sufficiently small size to be useable for the purpose intended. These prior art devices have included the use of rotatable mirrors, or mirrors utilized in other ways, the use of supplementary prisms disposed in the light path between the objective lens and the area to be observed, a device in the nature of an inflatable ballon for distending the stomach wall as well as a device in which the outer end of the instrument may be flexed or bent to change the location and field of observation. As mentioned above, such instruments have proved inadequate to solve the problem, and consequently have not come into general use.

It is accordingly an object of this invention to provide a flexible gastroscope of relatively small external diameter, and of a nature to permit flexure in either direction in a single plane, as well as rotation of an objective element through 360° to provide adequate observation of the entire interior of the stomach.

A further object of the invention is the provision of a flexible gastroscope incorporating a flexible optical system which serves to transmit an image of the area under observation, with the tube of the gastroscope flexed to position the outer end thereof at any desired location within the stomach, the transmitted image being of substantially the same quality as would be the case if the tube of the gastroscope were straight.

A still further object of the invention is the provision of a flexible gastroscope, including means for illuminating the interior of the stomach to be examined, and also including an objective viewing system rotatable through 360°, and including mechanism conveniently permitting such rotation from the inner end of the instrument adjacent the eyepiece.

Another object of the invention is the provision of a flexible gastroscope in which flexing of the tube is accomplished by means of a finger-engaging knob disposed on the inner end of the tube adjacent the eyepiece, actuation of such knob serving to flex the tube of the gastroscope in either direction in a single plane, there also being included means to lock the flexing means in any desired position of adjustment, and further means being provided to prevent flexure of the tube in planes other than the plane of flexure.

A further object of the invention is the provision of a flexible gastroscope for examination of the interior of the stomach, the outer wall of the tube of the gastroscope being yieldable, whereby upon the introduction of air pressure to the interior thereof, such wall will be distended, and will smooth out wrinkles in the stomach.

Figure 2:
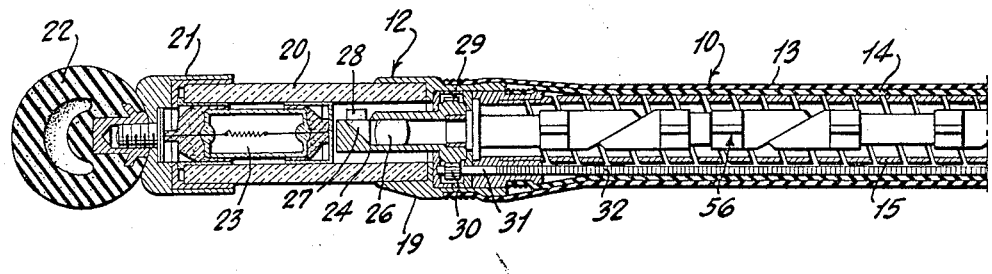
Figure 5:
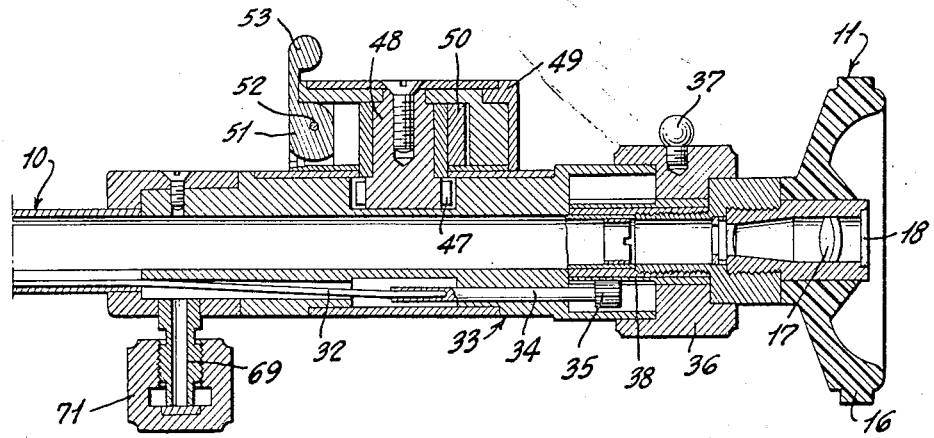
Figure 6:
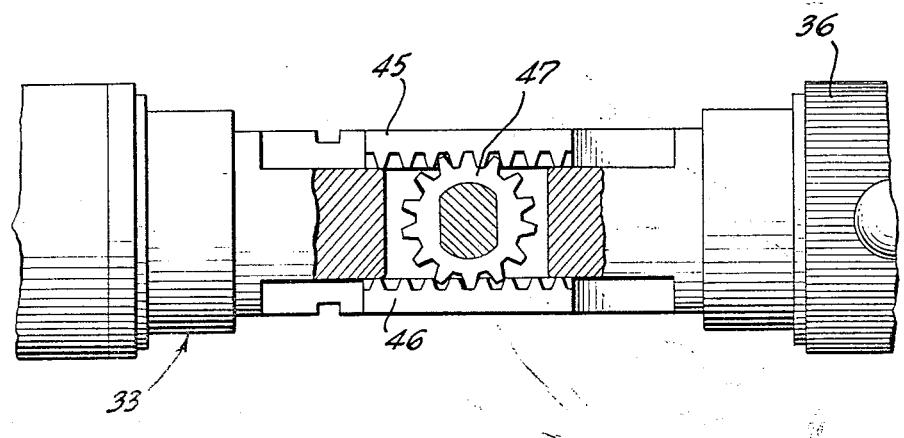
Figure 11:
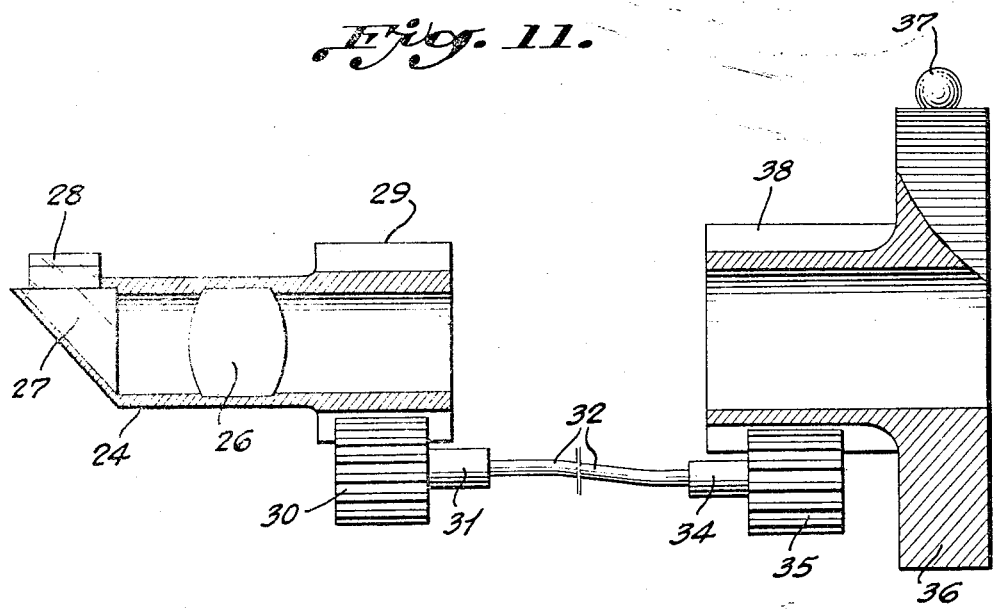
Figure 7:
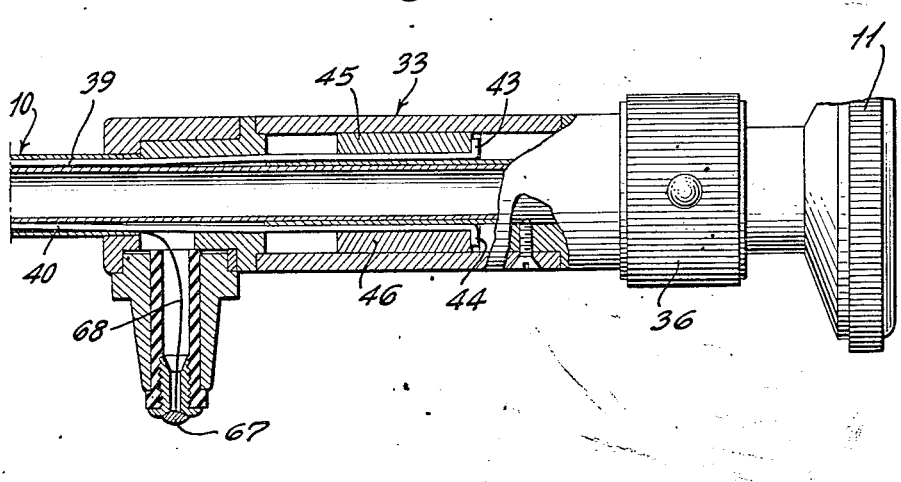
Figure 8:
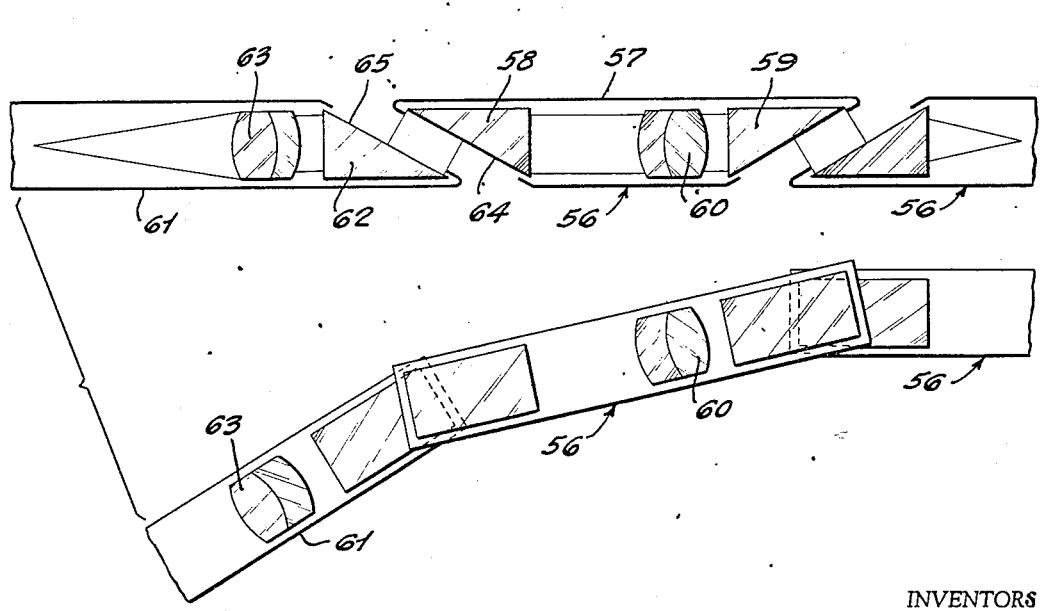

Further objects and advantages of the invention will be apparent from the following description taken in conjunction with the accompanying drawings, wherein:

FIG. 1 is an elevational view showing a flexible gastroscope constructed in accordance with this invention;

FIG. 2, a fragmentary, longitudinal sectional view to an enlarged scale, showing the structure of the outer or observing end of the instrument, as well as a portion of the flexible optical system disposed in the tube of the instrument;

FIG. 3, a fragmentary sectional view to a still further enlarged scale showing the outer or observing end of the instrument, and taken substantially on the line 2—2 of FIG. 4;

FIG. 4, a sectional view taken substantially on the line 4—4 of FIG. 3;

FIG. 5, a fragmentary, longitudinal, sectional view showing the structure of the inner or eyepiece end of the instrument, together with the mechanism for rotating the objective observation system, as well as the mechanism for flexing the tube;

FIG. 6, an elevational view with parts in section for greater clarity, and showing a portion of the means for flexing the tube of the gastroscope of this invention;

FIG. 7, a fragmentary elevational view with parts in section, and further showing the mechanism for flexing the tube of the instrument;

FIG. 8, a diagrammatic view showing the flexible optical system in a straight as well as in a curved position;

FIG. 9, a fragmentary, sectional view showing the articulation joint between the links of the flexible, optical system;

FIG. 10, a view in perspective, with parts broken away, and showing to an enlarged scale the mechanism for flexing the tube of the gastroscope of this invention; and, FIG. 11, a more or less diagrammatic view to an enlarged scale, and showing the mechanism for rotating the objective observation system of the gastroscope of this invention.

With continued reference to the drawings, there is shown a flexible gastroscope constructed in accordance with this invention, and which may well comprise an elongated, flexible tube 10 having an eyepiece 11 attached to the inner end thereof, and an observation head 12 attached to the outer end of the tube. As best shown in FIGS. 2, 3 and 4, the tube 10 may consist of an outer flexible and yieldable wall 13, an inner wall 14, spaced from the wall 13, and an inner spirally wound supporting member 15 which may be of metal or other suitable material. This entire structure is of course flexible to permit bending or flexure of the tube 10.

The eyepiece 11, as best shown in FIG. 5, may include an eyecup 16, and mounted axially within the cup 16 is an eyepiece lens 17, as well as a transparent cover plate 18. The eyepiece 11 is attached to the inner end of the tube 10 in any suitable manner.

With particular reference to FIGS. 2 and 3, the observation head 12 may well comprises a fitting 19 secured to the outer end of the tube 10 in any desired manner, and attached to the fitting 19 is a cylindrical, transparent tubular casing 20 which serves to provide a viewing window, permitting observation through 360°. Secured to the outer end of the casing 20 is a fitting 21, to which may be attached a pilot member 22 of yieldable material which may be of suitable configuration, and which serves to facilitate introduction of the instrument into the stomach to be examined. Disposed within the outer end of the casing 20 is a suitable electric lamp 23 which serves to project light rays through the transparent casing 20 to illuminate the area of the stomach to be observed.

Also disposed in the casing 20, inwardly of the lamp 23, is a sleeve 24, which may be rotatably mounted in a bushing 25 secured in the fitting 19, and mounted within the sleeve 24 is an objective lens 26. A prism 27 is mounted in the sleeve 24 outwardly of the objective lens 26, and the prism 27 serves to reflect light rays entering the sleeve 24 at right angles thereto through the objective lens 26. If desired, a suitable supplemental lens 28 may be attached to the prism 27.

A gear 29 is provided on the inner end of the sleeve 24, and such gear 29 meshes with a pinion gear 30 fixed to a shaft 31 rotatably mounted in the bushing 25. The shaft 31 in turn is fixed to a flexible shaft 32, which, as clearly shown in FIGS. 3 and 4, extends through the tube 10 between the inner wall 14 and the spiral supporting member 15.

As best shown in FIG. 5, an elongated, hollow body member 33 is attached to the inner end of the flexible tube 10, and rotatably mounted in the body member 33 is a shaft 34, to which is fixed a pinion gear 35. The shaft 34 is fixed to the inner end of the flexible shaft 32 extending through the tube 10. Rotatably mounted on the body member 33 is a ring 36 which may be conveniently, manually rotated by grasping the surface thereof, or by means of a finger-engaging knob 37, and the ring 36 is provided with a gear 38 which meshes the pinion gear 35 on the shaft 34.

It will be seen from the above-described structure that upon rotation of the ring 36, the pinion gear 35, as well as the shaft 34 and the flexible shaft 32 attached thereto will be rotated, which in turn will serve to rotate the pinion gear 30, the gear 29, and the sleeve 24 carried thereby. This will serve to rotate the prism 27 through 360°, thereby permitting observation through the transparent casing 20 throughout a complete circle.

In order to provide for convenient flexing or bending of the tube 10, there may be provided a pair of tension members 39 and 40 which, as clearly shown in FIGS. 3, 4 and 7, extend through the tube 10, and are fixed at their outer ends 41 and 42 to the inner wall 14 of the tube 10. The inner ends of the tension members 39 and 40 are secured at 43 and 44 to a pair of racks 45 and 46, respectively, which are slidably mounted in the body member 33. As best shown in FIGS. 5 and 6, a pinion gear 47 is disposed between and meshes with the racks 45 and 46, and the pinion gear 47 is provided with a spindle 48 rotatably mounted in the body member 33, and to which is fixed a finger-engaging knob 49. Surrounding the spindle 48 is a brake band 50, which engages the spindle 48 to prevent rotation thereof with the pinion 47 carried thereby, and in order to release the brake band 50 to permit rotation of the spindle 48 and pinion gear 47, there may be provided a cam 51, pivotally mounted at 52 on the knob 49, and the cam 41 may be provided with a finger-engaging member 53 to permit convenient operation thereof to release the brake 50, or permit engagement thereof with the spindle 48.

It will be seen that upon rotation of the finger-engaging knob 49, the pinion gear 47 will operate to move the racks 45 and 46 in opposite directions, depending upon the direction of rotation of the knob 49, and movement of the racks 45 and 46 will apply tension to one of the tension members 39 and 40, while releasing tension in the other tension member, resulting in flexing or bending the tube 10 in either direction in a single plane, since, as set forth above, the outer ends of the tension members 39 and 40 are fixed to the tube 10. Obviously, when it is desired to bend or flex the tube 10, the cam 51 is actuated to release the brake 50, and upon completion of the bending operation, the cam 51 is released to permit application of the brake 50, thereby locking the tube 10 in the desired position of adjustment.

Since it is desired to prevent flexure or bending of the tube 10 in other than a single plane, there may be provided means to accomplish this purpose in the form of a pair of rods 54 and 55, extending through the tube 10 on diametrically opposite sides thereof, and spaced angularly 90° from the tension members 41 and 42, and the rods 54 and 55 are secured along their lengths to the spiral-supporting member 15 of the tube 10. The provision of such rods 54 and 55 will serve to prevent bending of the tube 10 in planes other than the plane of flexure resulting from operation of the tension members 41 and 42.

With particular reference to FIGS. 2, 8 and 9, the flexible, optical system may comprise a plurality of elongated, rigid links 56 disposed in end-to-end relationship in the tube 10, and link between the end links may comprise a tubular housing 57 with a triangular prism 58 mounted in one end of the tube 57, and a triangular prism 59 mounted in the opposite end of the tube 57. Disposed between the prisms 58 and 59 is an inverting lens system 60. The end links in the flexible, optical system may, as shown in FIG. 8, comprise a housing 61 having a triangular prism 62 mounted in one end thereof, and an inverting lens system 63 mounted in the housing 61. The housing 61 of the end link adjacent the outer end of the instrument may be secured to the bushing 25, while the end link at the inner end of the instrument may be secured to the body member, 33.

As best shown in FIGS. 8 and 9, the face 64 of the prism 58 overlaps the face 65 of the prism 62, and as shown in FIG. 9, an articulation joint 66 is provided between the housings 57 of the links 56, and between the housing 57 and the casing 61 of each end link. The axis of the articulation joint 66 coincides with the axes of the faces 64 and 65 of the overlapping prisms 58 and 62.

It will thus be seen that the entire optical system comprising the links 56 may be bent or flexed in either direction in a single plane, and regardless of the position will serve to transmit an image through the system, without deterioration due to the flexing of the system. As shown in FIG. 10, the tube 10 and optical system carried thereby may be flexed through an angle of 70° to each side of the center line, thereby providing a total flexure of 140°, which together with rotation of the observation prism 27 through 360°, provides for adequate observation of the entire interior of the stomach.

As shown in FIG. 7, the body member 33 may be provided with an electrical connection 67 for connecting a source of electric power, which, through a conductor 68 extending through the tube 10, serves to energize the electric lamp 23. Also provided on the body member 33, as shown in FIG. 5, is a connecting fitting 69 for connecting a source of air pressure which may flow into the space 70 between the outer wall 13, and inner wall 14 of the tube 10 to distend the outer wall 13, thereby eliminating wrinkles in the stomach. The fitting 69 may be closed by a cap 71 when the same is not in use.

It will be seen that by the above-described invention there has been provided a flexible gastroscope of minimum dimensions which may be utilized to provide adequate observation of the entire interior of the stomach, and in which the image transmitted through the gastroscope is of substantially the same quality as would be provided by a straight instrument, even though the instrument of this invention may be flexed or bent through an angle of 140°, and the field of view may encompass a complete circle.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. A flexible gastroscope comprising an elongated flexible tube, an eyepiece attached to the inner end of said tube and an observation head attached to the outer end of said tube, said observation head including a cylindrical transparent tubular casing providing a viewing window permitting observation through 360°, an electric lamp to illuminate the field of observation disposed in said casing, a sleeve rotatably mounted in said head within said casing, an objective lens mounted in said sleeve, a prism mounted in said sleeve for reflecting light rays entering through said casing at right angles to the axis of said sleeve through said objective lens, a gear on said sleeve and a pinion rotatably mounted in said head and meshing with said gear, a flexible shaft fixed at the outer end to said pinion and extending through said tube to a point adjacent said eyepiece, a second pinion fixed to said shaft, a ring rotatably mounted on said tube adjacent said eyepiece and a gear on said ring meshing with said second pinion, whereby upon rotation of said ring said sleeve and prism carried thereby will rotate to permit observation through 360°, means for flexing said tube in either direction in a single plane to dispose said observation head in different locations, means to prevent flexing of said tube in planes other than the plane of flexure and a flexible optical system disposed in said tube to transmit an image from said head to said eyepiece with said head disposed in a desired position for observation.

2. A flexible gastroscope comprising an elongated flexible tube, an eyepiece attached to the inner end of said tube and an observation head attached to the outer end of said tube, said observation head including a cylindrical transparent tubular casing providing a viewing window permitting observation through 360°, an electric lamp to illuminate the field of observation disposed in said casing, a sleeve rotatably mounted in said head within said casing, an objective lens mounted in said sleeve, a prism mounted in said sleeve for reflecting light rays entering through said casing at right angles to the axis of said sleeve through said objective lens, a gear on said sleeve and a pinion rotatably mounted in said head and meshing with said gear, a flexible shaft fixed at the outer end to said pinion and extending through said tube to a point adjacent said eyepiece, a second pinion fixed to said shaft, a ring rotatably mounted on said tube adjacent said eyepiece and a gear on said ring meshing with said second pinion, whereby upon rotation of said ring said sleeve and prism carried thereby will rotate to permit observation through 360°, means for flexing said tube in either direction in a single plane to dispose said observation head in different locations and a flexible optical system disposed in said tube to transmit an image from said head to said eyepiece with said head disposed in a desired position for observation.

3. A flexible gastroscope as defined in claim 1, in which the means to prevent flexing of said tube in planes other than the plane of flexure comprises a pair of rods extending through said tube at diametrically opposite sides and angularly spaced 90° from said tension members, said rods being fixed along the length thereof to said tube.

References Cited by the Examiner
UNITED STATES PATENTS

| | | | |
|---|---|---|---|
| 944,830 | 12/1909 | Sussman | 128—8 |
| 1,675,216 | 6/1928 | Heimberger | 128—6 |
| 2,975,785 | 3/1961 | Sheldon | 128—6 |
| 2,987,960 | 6/1961 | Sheldon | 128—6 X |
| 3,010,357 | 11/1961 | Hirschowitz | 128—6 X |
| 3,110,762 | 11/1963 | Frank | 88—1 |

FOREIGN PATENTS

| | | |
|---|---|---|
| 23,821 | 1901 | Great Britain. |
| 548,462 | 10/1942 | Great Britain. |

RICHARD A. GAUDET, *Primary Examiner.*

DALTON L. TRULUCK, *Examiner.*